United States Patent [19]

Shona

[11] Patent Number: 5,592,619

[45] Date of Patent: Jan. 7, 1997

[54] HIGH-SECURITY IC CARD

[75] Inventor: Yoshihiro Shona, Tokyo, Japan

[73] Assignee: Oki Electric Industry Co., Ltd., Tokyo, Japan

[21] Appl. No.: 281,213

[22] Filed: Jul. 27, 1994

[30] Foreign Application Priority Data

Jul. 28, 1993 [JP] Japan ................... 5-205691

[51] Int. Cl.⁶ .................................. G06F 11/34
[52] U.S. Cl. ......................... 395/186; 235/379
[58] Field of Search .................... 395/575, 800, 395/550, 186; 235/379, 380, 492, 382, 441, 375, 379, 487; 364/918.7, 925.6, 927.8, 941.1, 949.71; 439/945, 945, 947

[56] References Cited

U.S. PATENT DOCUMENTS

| | | | |
|---|---|---|---|
| 4,734,568 | 3/1988 | Watanabe | 235/487 |
| 4,748,320 | 5/1988 | Yorimoto et al. | 235/380 |
| 4,758,718 | 7/1988 | Fujisaki et al. | 340/825.32 |
| 4,908,038 | 3/1990 | Matsumura et al. | 235/379 |
| 5,206,938 | 4/1993 | Fujioka | 395/410 |
| 5,276,903 | 1/1994 | Shinagawa | 395/800 |
| 5,286,962 | 2/1994 | Fujioka et al. | 235/492 |
| 5,355,413 | 10/1994 | Ohno | 380/24 |

FOREIGN PATENT DOCUMENTS

| | | |
|---|---|---|
| 477503 | 4/1992 | European Pat. Off. . |
| 512542 | 11/1992 | European Pat. Off. . |
| 583006 | 2/1994 | European Pat. Off. . |
| 3844032 | 1/1990 | Germany . |
| 2-89169A | 3/1990 | Japan . |
| 2-112082A | 4/1990 | Japan . |

Primary Examiner—Robert W. Beausoliel, Jr.
Assistant Examiner—Albert Décady
Attorney, Agent, or Firm—Spencer & Frank

[57] ABSTRACT

An IC card device includes a card base, at least one integrated circuit disposed on the card base, and communication circuitry disposed on the card base and coupled to the at least one integrated circuit, for transferring signals between the at least one integrated circuit and an external device. The at least one integrated circuit includes a first reloadable memory having a command table area for storing command tables, a second read-only memory for storing a non-reloadable command table, and selecting circuitry, operatively coupled to the first memory and the second memory, for selecting either the non-reloadable command table stored in the second memory or a command table stored in the command table area of the first memory. The command table of the first memory and the command table of the second memory store command class designations which designate the class of each of the commands, and store command code designations which designate the operation corresponding to each of the commands.

8 Claims, 8 Drawing Sheets

FIG.2(A)
| COMMAND No. | COMMAND NAME |
|---|---|
| 1 | WRITE |
| 2 | READ |
| 3 | CHECK KEY |
| 4 | SELECT DATA FILE |
| ⋮ | ⋮ |
FIG.2(B)
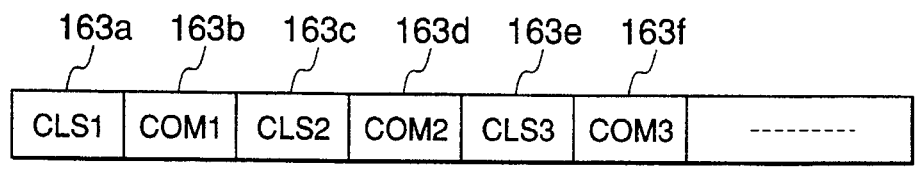
FIG.2(C)
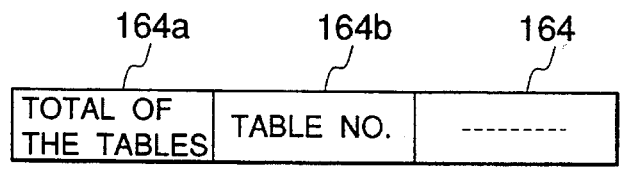
FIG.4
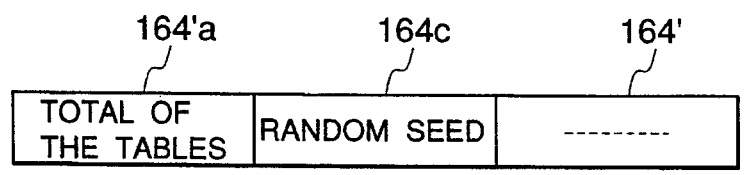

HIGH-SECURITY IC CARD

REFERENCE TO RELATED APPLICATIONS

This application claims the right of priority under 35 U.S.C. 119, of Japanese Patent Application Ser. No. 05-205691, filed on Jul. 28, 1993.

BACKGROUND OF THE INVENTION

1. Field of the Invention

This invention relates to an IC card having a control unit and a storage unit provided therein, for receiving various commands from an external device so as to execute various processes in accordance with the received various commands.

2. Description of the Related Art

An IC card has recently been used in various fields. The IC card comprises a contact unit disposed on the surface of the IC card and electrically connected to an external device so as to effect the transfer of signals and data between the external device and the contact unit, and a semiconductor device disposed inside the IC card. This type of semiconductor device is normally comprised of a control unit including a microprocessor, etc., a Read Only Memory (ROM) for storing control programs therein, an Electrically Erasable Programmable Read Only Memory (EEPROM), etc. The EEPROM stores transaction data and the like used for the IC card therein.

This type of IC card has been employed in banking facilities such as a bank, etc. Due to the nature of banking transactions, the IC card employed in banking facilities requires high security.

Such an IC card has been disclosed in, for example, Japanese Patent Application Laid-Open Publication No. 2-89169 laid open to public inspection on Mar. 29, 1990.

SUMMARY OF THE INVENTION

It is an object of the present invention to provide a high-security IC card capable of maintaining confidentiality of various commands stored therein.

It is another object of the present invention to provide a high general-purpose IC card adaptable to various application systems used for the IC card without changing the mast for a ROM.

In order to achieve the above objects, an IC card according to the present invention comprises a read-only memory (ROM) for storing a command table therein, a reloadable memory for storing a plurality of command tables therein, a selecting unit for selecting the control command table stored in the ROM one of the command tables stored in the reloadable memory, and a control unit for driving the IC card in accordance with the selected command table.

In order to achieve the above objects, the IC card according to the present invention is further provided with an enable flag for validating or invalidating the respective control commands stored in the reloadable memory.

According to the above construction of the present invention, an IC card can be realized which provides high security and high general purposes.

The present application discloses other embodiments made to achieve the above objects. These embodiments will be understood from the appended claims and the accompanying drawings.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 2(A), 2(B) and 2(C) illustrate operation commands employed in the IC card shown in FIG. 1, wherein FIG. 2(A) is a table for describing the relationship between command (instruction) numbers and operation commands, FIG. 2(B) is a view for describing both command class (CLS) codes and command (COM) codes respectively stored so as to correspond to the command numbers and FIG. 2(C) is a view for describing codes such as the number of tables, etc. stored in a command management area;

FIG. 4 is a view for describing codes such as the number of tables, etc. stored in a command management area employed in an IC card according to a second embodiment of the present invention;

DETAILED DESCRIPTION OF THE PREFERRED EMBODIMENTS

Preferred embodiments of the present invention will hereinafter be described with reference to the accompanying drawings.

A first embodiment of the present invention will first be described.

Figure 1:
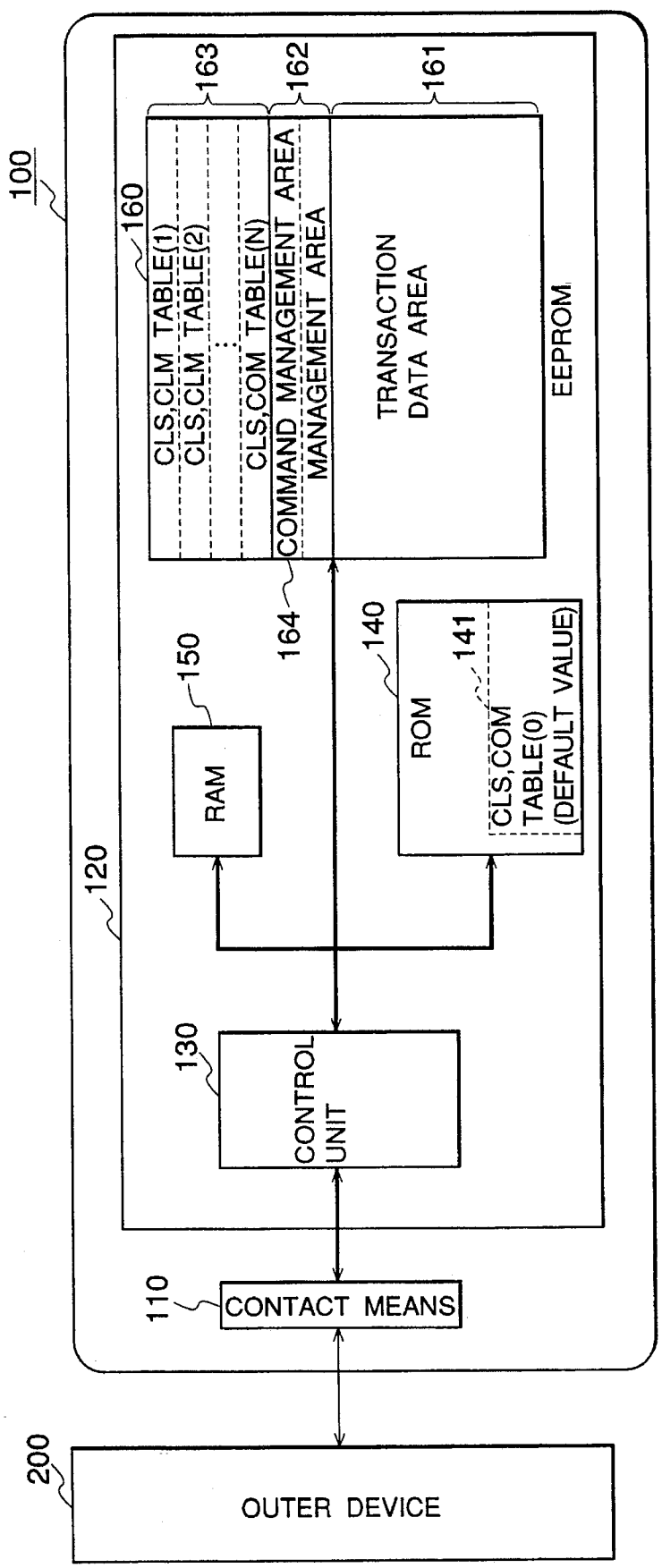
FIG. 1 is a block diagram showing the structure of an IC card according to a first embodiment of the present invention.

An IC card 100 shown in FIG. 1 comprises a card base material having a contact unit 110 for transmitting a signal (including data) to an outer device 200 and receiving the same therefrom and at least one IC chip 120 both incorporated therein. The IC chip 120 comprises a control unit 130 comprised of a microprocessor, etc., for controlling the entire card, a ROM 140 for storing a control program, etc. therein, a RAM 150 for temporarily storing data therein, and an EEPROM 160 for storing transaction data and the like therein. A "0"th command table (CLS, COM tables) 141 is stored in the ROM 140. On the other hand, a transaction data area 161 comprised of a plurality of areas, for storing transaction data therein, a management area 162 for controlling or managing respective areas, and a command table area 163 comprised of one or more command tables (CLS, COM tables) exist within the EEPROM 160. The command table area 163 is classified or divided into "1"st through "N"th tables.

The contents of processing commands employed in the IC card 100 have been determined according to command numbers as shown in FIG. 2(A). Described specifically, a CLS1 (163a), a COM1 (163b), a CLS2 (163c), a COM2 (163d), a CLS3 (163e), a COM3 (163f), . . . , are respectively stored in the "1"st through "N"th tables as shown in FIG. 2(B). Further, CLS codes and COM codes are stored in their corresponding "1"st through "N"th tables in order from the command number "1". CLS and COM codes different from one another even in the case of the same command processing are stored at table numbers "1" and "2", for example.

When the IC card 100 makes decisions as to respective command processes, it can be easily determined to which CLS and COM stored in the command tables one of the commands employed in the IC card belongs or corresponds as counted from the head of the command tables. Further, an additional increase or change in these command tables can be performed under the permission of a specific password, for example. On the other hand, the management area 162 includes a command management area 64 for managing the command table area 163. As shown in FIG. 2(c), the command management area 164 includes the number or total of the tables 164a which exists within the internal command table area 163, and a now designated table No. 164b.

The operation of the IC card 100 having the above construction will now be described.

Figure 3:
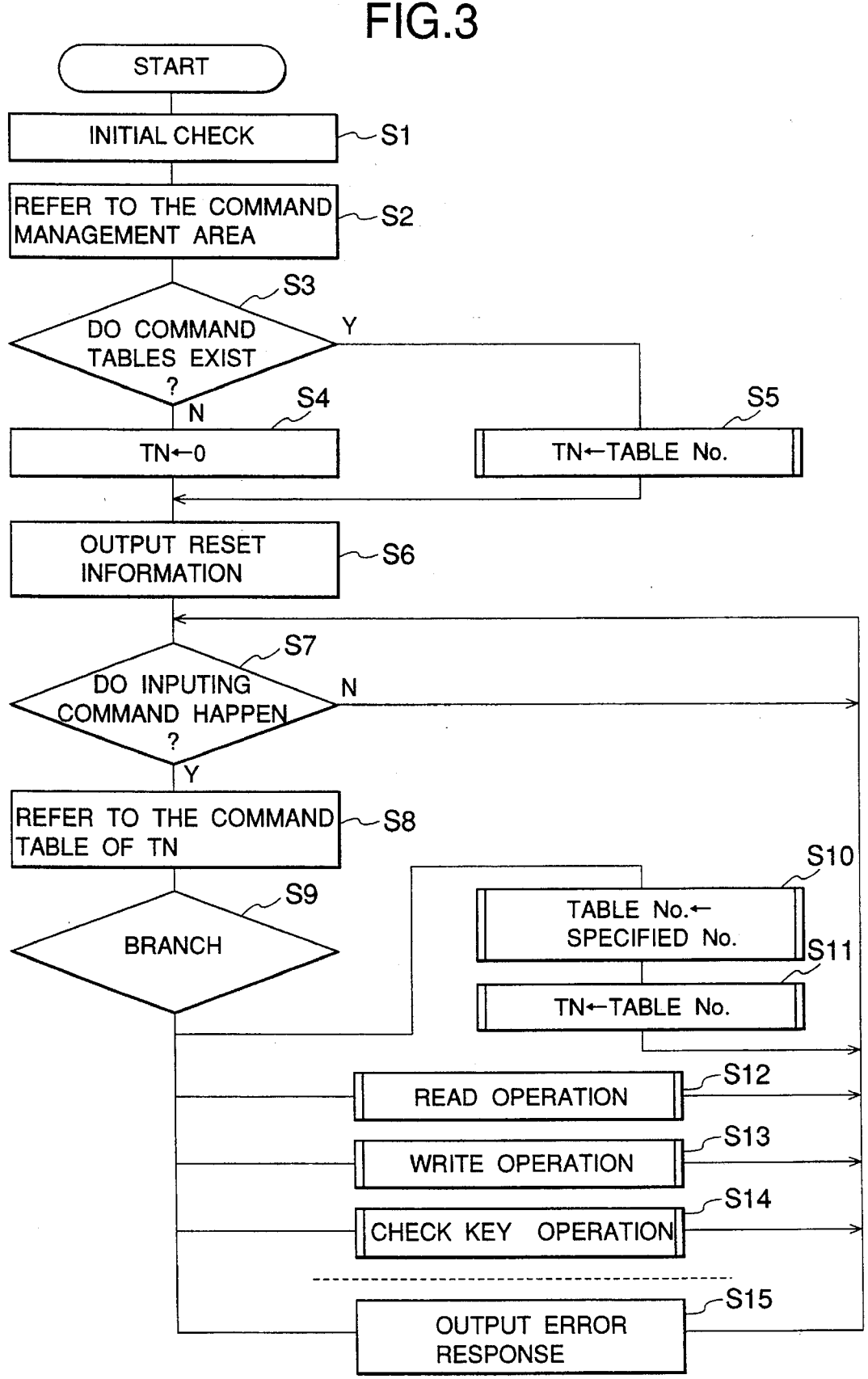
FIG. 3 is a flowchart for describing the flow of a process executed by the IC card shown in FIG. 1.

FIG. 3 is a flowchart for describing a routine procedure of the IC card according to the first embodiment.

When a power supply voltage and a clock is supplied to the IC card 100 of the present invention from the outer device 200 and a reset signal is thereafter applied to the IC card 100, the IC card 100 proceeds to Step S1 where an initial check is performed. The initial check is carried out to check whether or not respective parts in the IC card 100 are normally operated. Next, the IC card proceeds to Step S2 where the command management area 164 is checked. When it is determined in Step S3 that the total of the tables 164a is "0", i.e., when no command table exists within the command table area 163, the IC card proceeds to Step S4 where the value of TN is set to "0". Namely, the command table 141 in the ROM 140 is specified or designated.

On the other hand, when the total of the tables 164a is not "0", the IC card 100 proceeds to Step S5 where the value of the now-specified table No. 164b is substituted in the TN. Next, the IC card 100 proceeds from Step S4 or S5 to Step S6 where reset information (Answer to Reset) for informing the outer device 200 of communication specifications of the IC card 100 or the like is output so that the IC card 100 enters into a command-input waiting operation (Step S7). When a command is input in this condition, the IC card 100 proceeds to Step S8 where the IC card 100 refers to the command table of the number corresponding to the value of TN. When TN=1, for example, the IC card 100 refers to the "1"st command table. Thus, the command will cause a branch to various command operations (Step S9). Various operations such as a read operation (Step S12), a write operation (Step S13), a key check operation (Step S14), etc. are performed. Thereafter, the IC card 100 returns to Step S7. When a COM and a CLS for a command input in Step S7 represent a COM and a CLS for a table change command for changing a command table, the IC card 100 proceeds to Step S10 where the table No. 164b in the command management area 164 is changed to a specified or designated number. Further, the value of TN is changed to the value of the table No. 164b (Step S11 ). Thereafter, the IC card 100 returns to the command-input waiting operation (Step S7) so as to wait for the next command input.

When the next command is input, the IC card 100 is activated so as to correspond to a CLS and a COM associated with the changed table No. If those corresponding to the COM and CLS input in Step S9 are not included in the command table of the number corresponding to the value of TN, then the IC card 100 proceeds to Step S15 where a response for informing the outer device 200 of a command error is output therefrom. Thereafter, the IC card 100 enters into the command-input waiting operation again (Step S7).

In the first embodiment as described above, the command table area 163 having one or more CLS and COM tables is provided within the EEPROM 160. Further, the table change command for specifying or designating the number of a command table to be used is provided so that the values of the CLS and COM for the command can be changed to others.

According to the IC card that shows the first embodiment of the present invention as described above, a command code sent from the outer device 200 is first determined or judged based on a non-rewritable or -reloadable command table provided within a read-only nonvolatile memory (ROM 140). In this condition, the command management area is designated so as to specify the non-rewritable command table. On the other hand, when the command code becomes known to a third party or is apt to come to the knowledge of the third party, a change in the designation of the command management area can be performed. Thus, the command codes are determined based on the command tables provided within the rewritable or-reloadable nonvolatile memory (EEPROM 160).

One of these command tables may be selected from a plurality of command tables. Further, the contents of a single command table may be rewritten into others and put in use.

Thus, even if the conditions of communication between the IC card and the outer device, which is performing in accordance with a command in a given command table, become known to the third party with a malicious intent, the IC card is subsequently kept secret by using other command table. If, in this case, the command table exists only within the non-reloadable memory, it is then unavoidable that the IC card is brought into an unusable state or a mask for a non-reloadable memory must be changed to another as has normally been performed in the conventional example. This needs a significant increase in cost.

The IC card of the present invention can be reduced in cost and can provide high security.

A second embodiment of the present invention will now be described.

In the second embodiment, the number or total of the tables 164'a which exists within a present command table area 163 and a random number initial value 164c for generating a random number or series of random numbers within an IC card 100 are provided within a command management area 164' as shown in FIG. 4. The random number initial value 164c is used to generate random numbers (pseudo-random numbers) and is rewritten into another each time the random number is generated.

Figure 5:
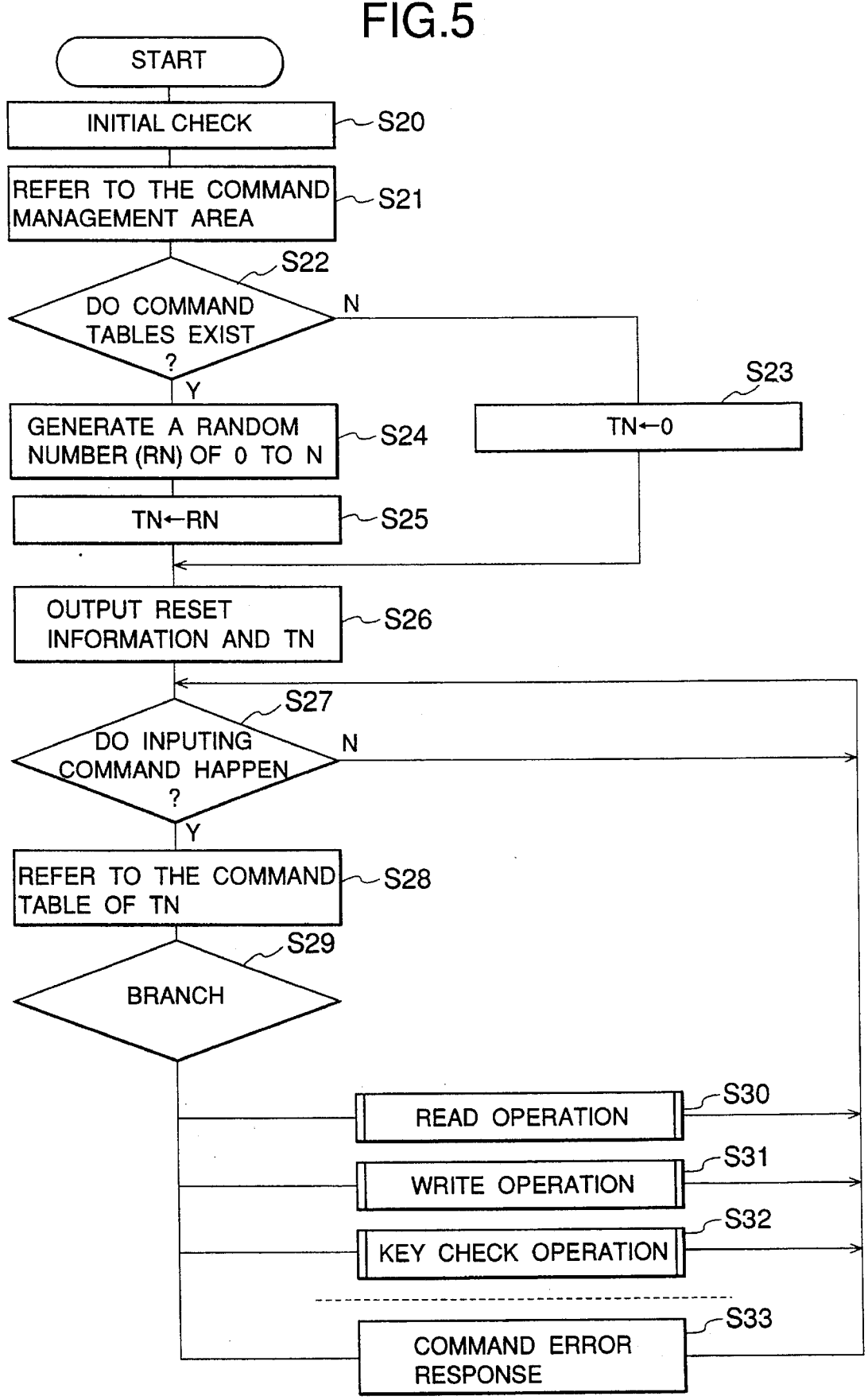
FIG. 5 is a flowchart for describing the flow of a process executed by the IC card shown in FIG. 4.

FIG. 5 is a flowchart for describing the operation of the IC card 100 according to the second embodiment. When the IC card 100 is supplied with a power supply voltage and a clock from an outer device 200 and is reset, the IC card 100 performs an initial check (Step S20) and refers to the command management area 164' (Step S21) in a manner similar to the first embodiment. If it is next judged in Step S22 that the total of the tables 164'a in the command management area is "0"(no command table exists within the command table area 163), then the IC card 100 proceeds to Step S23. In Step S23, "0" indicative of the number of a command table 141 in a ROM 140 is substituted in a TN corresponding to an actually-used command table number. If it is judged in Step S22 that the total of the tables 164' a is not "0", then the IC card 100 proceeds to Step S24 where random numbers RN having an integral range of "0" to "N" are generated using the random number initial value 164c and the RN are substituted for the TN (Step S25). At this time, the random number initial value 164c is rewritten into another value to produce the next random number.

Next, the IC card 100 proceeds from each of Steps S23 and S25 to Step S26 where reset information (Answer to Reset) for informing an outer device of communication specifications of the IC card 100 and a TN indicative of the number of a command table to be used are output to the outer device. Thereafter, the IC card 100 enters into a command-input waiting operation (Step S27). The outer device can recognize based on the TN which command table would be used.

When a command is now input to the IC card 100, the IC card 100 proceeds to Step S28 where a reference to a command table designated by the value of the TN is performed. Next, the values of a CLS and a COM for the input command are compared with those of a CLS and a COM in a specified or designated command table. Further, the command will cause a branch to various command operations (Steps S30, S31, S32, etc.) based on the result of comparison (Step S29). Thereafter, the IC card 100 returns to the command-input waiting operation (Step S27). If those corresponding to the COM and CLS for the input command are not included in the specified command table, then the IC card 100 proceeds from Step S29 to Step S33 where a command error response is output therefrom. Thereafter, the IC card 100 gets back to Step S27. Since different command tables are specified or designated every time using the random numbers in the second embodiment as described above, the IC card 100 can be prevented from being abused after the CLS and COM have been checked by the third party.

A third embodiment of the present invention will now be described.

Figure 6:
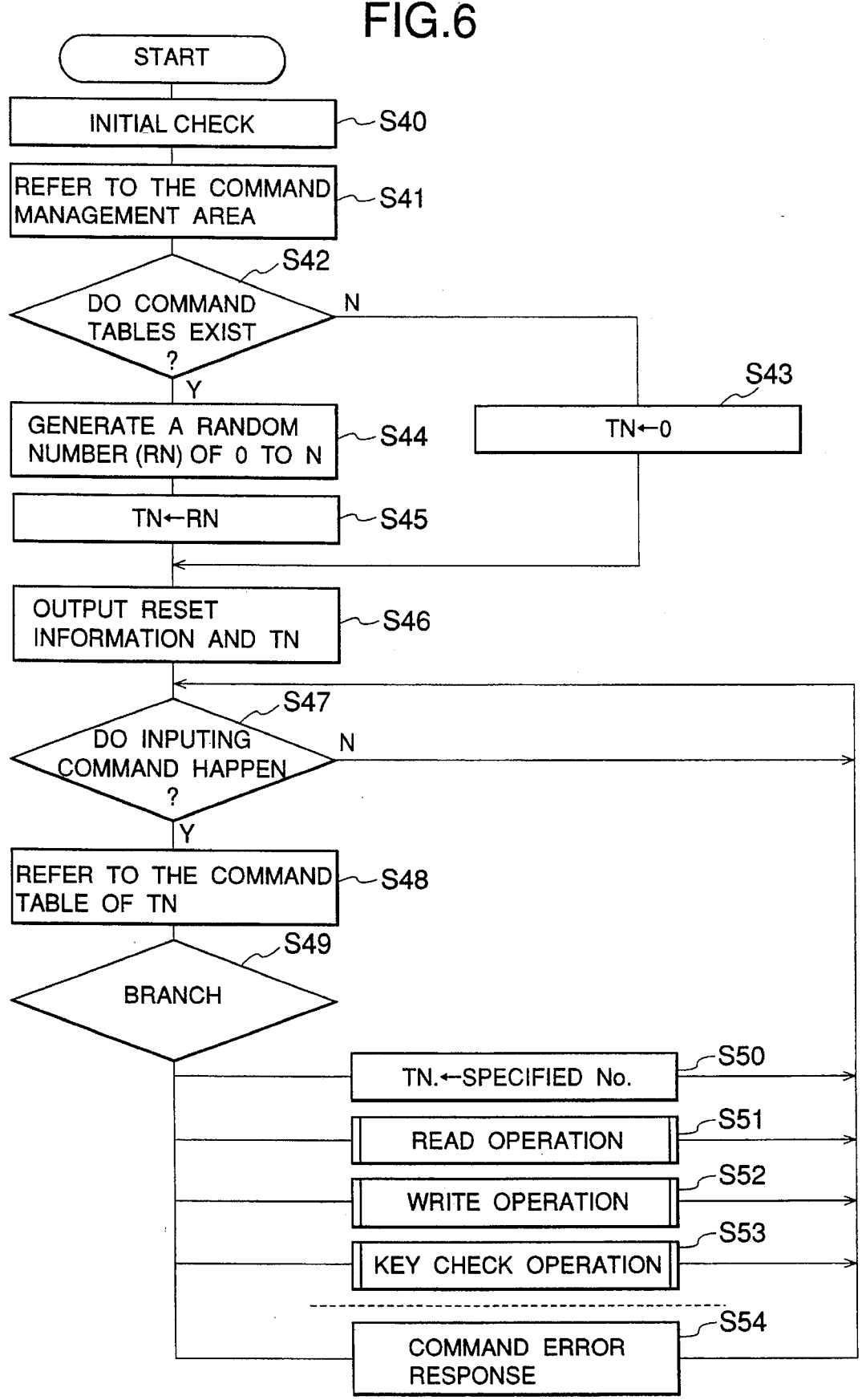
FIG. 6 is a flowchart for describing the flow of a process executed by an IC card according to a third embodiment of the present invention.

The third embodiment combines the first and second embodiments into one. A command management area 164' is constructed as shown in FIG. 4 in a manner similar to the second embodiment. FIG. 6 is a flowchart for describing the flow of a process of an IC card according to the third embodiment. Steps from Step S40 for performing an initial check to Step S49 for causing a command to branch into various command operations are identical to those executed in the second embodiment and their description will therefore be omitted. The IC card proceeds to the various command operations (Steps S51, S52 and S53)in response to a CLS and a COM for an input command. Thereafter, the IC card enters into a command-input waiting operation again (Step S47). However, if a table change command for changing the number of a command table is input, then the IC card proceeds to Step S50 where a specified table number is substituted in an TN. Thereafter, the IC card returns to Step S47 for the command-input waiting operation.

The previous command table is changed to a new command table by this processing and the following command is divided into various command operations in accordance with a table of a newly-designated number. If those corresponding to the COM and CLS for the command input in Step S47 are not included in the specified command table, then the IC card proceeds to Step S54 where a command error response is output therefrom.

According to the IC card of the present invention, as has been described above in detail, the command table provided only within the ROM is normally provided even within the EEPROM. Thus, the command table can be changed to another without a change in the mask for the ROM. Further, the command table can be changed at regular intervals in accordance with the random numbers and the table change command. It is therefore possible to prevent the CLS and COM for the command from leaking out to the third party before it happens and to improve the security.

A fourth embodiment of the present invention will now be described.

Figure 7:
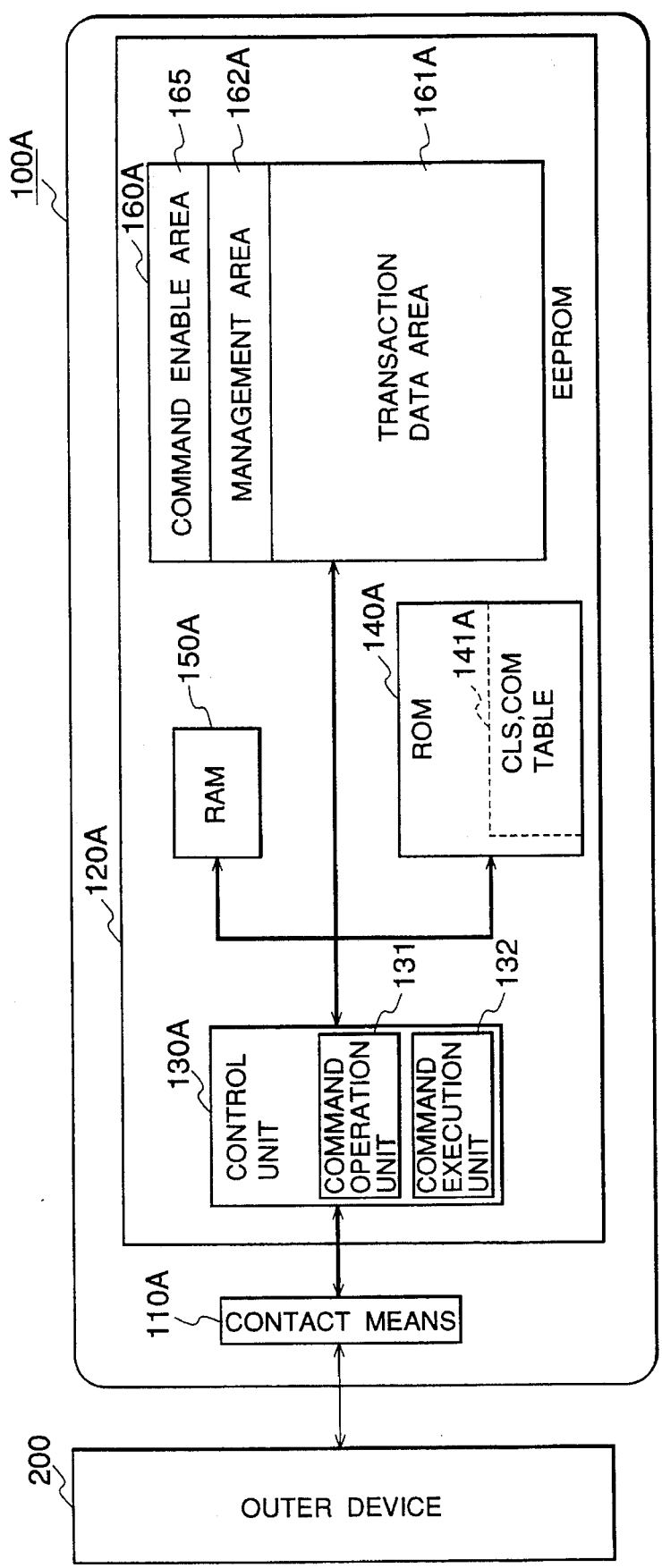
FIG. 7 is a block diagram showing the structure of an IC card according to a fourth embodiment of the present invention.

FIG. 7 is a block diagram showing the structure of an IC card according to the present embodiment.

Figure 8A:
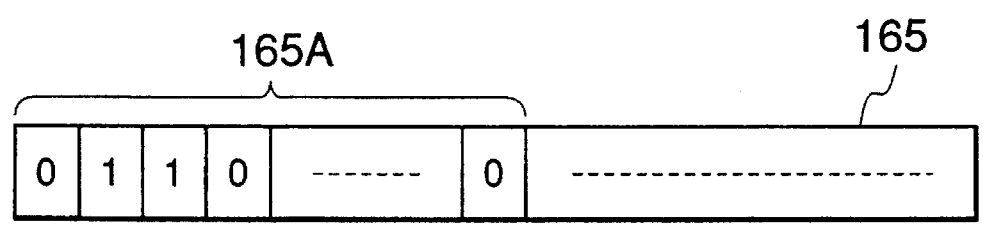
FIGS. 8(A) and 8(B) are respectively views for describing flags stored in a command management area of the IC card shown in FIG. 7.

The IC card 100A shown in FIG. 7 comprises a contact unit 110A and at least one IC chip 120A comprised of a control unit 130A, a ROM 140A, a RAM 150A, an EEPROM 160A, etc. A command table 141A exists within the ROM 140A together with a control program. A transaction data area 161A comprised of a plurality of areas, for storing transaction data therein, a management area 162A for managing respective areas and a command enable area 165 for validating or invalidating respective commands are provided within the EEPROM 160A. As shown in FIG. 8(A), the command enable area 165 has flags 165A for respectively judging or determining whether the respective commands are made valid or invalid. Here, command numbers are applied to their corresponding commands as shown in FIG. 2(A). It is determined based on each command number to which command each flag 165A corresponds. When a "2"nd read command is input, for example, it is judged that the command is effective if a second flag is set to "1" as seen from the first flag, and the read command is executed. On the other hand, if the flag is found to be "0", then the read command is invalidated and a command error response is output as if no read command exists.

The control unit 130A has a command operation unit 131 and a command execution unit 132.

When a predetermined enable flag change command is input to the command operation unit 1 31, the command operation unit 131 brings a flag 165A designated to the command into either validity or invalidity. When a command other than the enable flag change command is input to the command execution unit 132, the command execution unit 132 executes a process for the input command when a flag 165A corresponding to the command is valid or effective. Further, when the flag 165a is ineffective, the command execution unit 132 outputs an error response therefrom.

Figure 9:
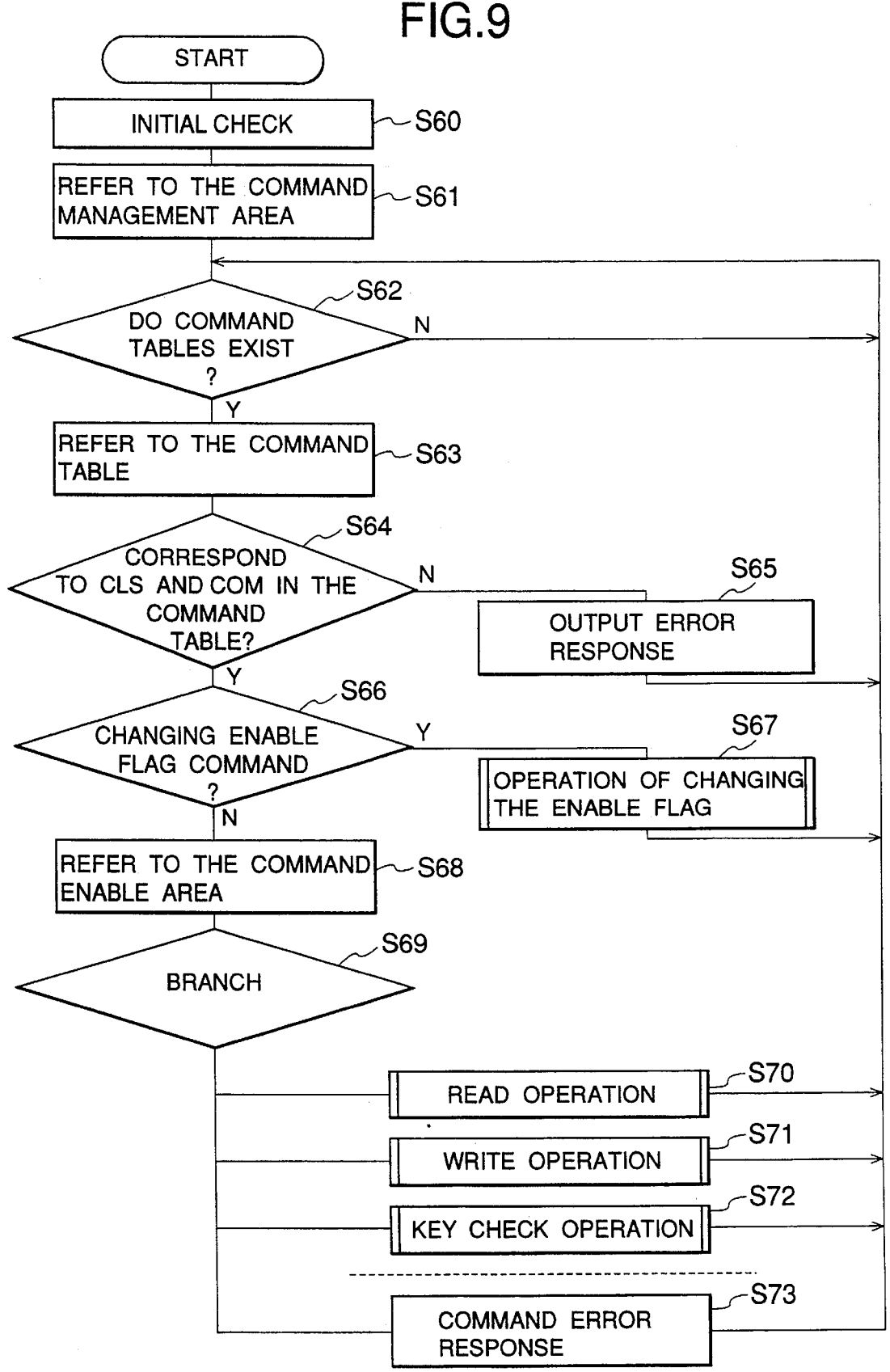
FIG. 9 is a flowchart for describing the flow of a process executed by the IC card shown in FIG. 7.

FIG. 9 is a flowchart for describing a process of the IC card according to the fourth embodiment.

When a power supply voltage and a clock are supplied to the IC card 100A from an outer device 200 and a reset signal is thereafter applied to the IC card 100A, the IC card 100A performs an initial check (Step S60). Next, the IC card 100A outputs reset information (Answer to Reset) for informing the outer device of communication specifications or the like thereof (Step S61). Thereafter, the IC card 100A enters into a command-input waiting operation in Step S62. When a command is now input, the IC card 100A refers to the command table 141A in the ROM 140A (Step S63) to thereby determine or judge whether a corresponding command exists (Step S64). If it is determined in Step S64 that no corresponding command exists, then the IC card 100A proceeds to Step S65 where the IC card 100A outputs a command error response and is reset to the command-input waiting operation (Step S62). If it is determined in Step S64 that the corresponding command exists, then the IC card 100A proceeds to Step S66 where a decision is made as to whether the command is of the enable flag change command for changing the flag 165A in the command enable area 165. If it is determined in Step S66 that the command is the enable flag change command, then the IC card 100A proceeds to Step S67 where the designated or specified enable flag is changed. Thereafter, the IC card 100A returns to the command-input waiting operation in Step S62.

On the other hand, if it is determined in S66 that the command does not correspond to the enable flag change command, then the IC card 100A checks the enable flags 165A in the command enable area 165 (Step S68). When the enable flag for the input command is "1", respective operations (Steps S70, S71, S72, etc.) for the input command are executed. On the other hand, if the enable flag for the input command is found to be "0", then the IC card 100A outputs a command response error (Step S73) and returns to the command-input waiting operation.

With the above operation, the command, which corresponds to the enable flag change command and brings the enable flag to "0", is externally seen as if the command does not exist, even though the command has been prepared. Thus, commands, which are not employed in an application can be selectively invalidated. A card-issuing command and the like, which are normally unused in the application, for example, can be easily invalidated after the issuance of the IC card.

Figure 8B:
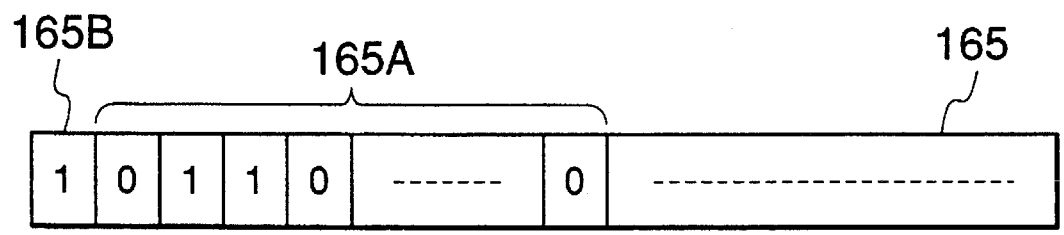

In an IC card according to a fifth embodiment of the present invention, an all enable flag 165B for collectively validating or invalidating all the commands is further provided within a command enable area 165 as shown in FIG. 8(B). A flowchart for describing a procedure of the fifth embodiment corresponds to one obtained by changing a flowchart shown in FIG. 9 in the following manner. When the all enable flag 165B is of "0" in Step S69 shown in FIG. 9, the IC card outputs a command error response in Step S73 to each of all the commands. On the other hand, when the all enable flag 165B is of "1", the IC card executes various command operations or outputs an error response in accordance with the enable flag 165B. Thereafter, the IC card returns to a command-input waiting operation (Step S62). Incidentally, an enable flag change command may be commonly used as a command for changing the all enable flag 165B. Alternatively, an additionally dedicated command may be provided as the above command.

If the IC card according to the fifth embodiment is used by setting the all enable flag 165B to "0" after completion of the use of the IC card and changing it to "1" upon starting the use of the IC card under the operation of an outer device of an application system, then the IC card cannot be attacked unless the command for changing the all enable flag 165B is known to a malicious third party even if the third party attacks a CLS and a COM to check or inspect them or the third party attempts to alter data, thereby making it possible to prevent the abuse of the IC card beforehand.

Although the embodiments of the present invention have been described above in detail, the present invention is not necessarily limited to or by the above embodiments. In the first embodiment, the now-designated command table number is first stored as a variable (provided on the RAM 150) TN and then used, for example. However, the table number (164b) may be used as it is. Even in the case of the second and third embodiments, the table number (164b) is provided and the random number RN may be substituted in the table number (164b).

In the fourth and fifth embodiments, the command is rendered effective when the enable flags 165A and the all enable flag 165B are "1". However, the command may be effective when they are "0". Although the decision (Step S66) about the enable flag change command is performed before the reference to the command enable area (Step S68), its decision may be carried out simultaneously with the command branch in Step S69. In this case, however, there is a possibility that the enable flags cannot be changed again when the enable flag change command is made ineffective. In the case of the fifth embodiment in particular, the command cannot be used again when the all enable flag 165B is invalidated. It is therefore necessary to make the decision (Step S66) about the enable flag change command before the execution of Step S68.

Incidentally, the kinds and contents of the various command operations employed in the above embodiments are not necessarily limited to those in the respective embodiments. The contact unit employed in each embodiment is not limited to the contact type so long as a means capable of effecting the transfer of a signal between the outer device and the contact unit is used.

According to the present invention, as has been described above in detail, the command table area having one or more command tables and the command management area for managing the command tables are provided within the rewritable or erasable memory (EEPROM in the present embodiments) separately from the command tables (CLS, COM tables) in the read-only memory (ROM). Further, one of the command tables can be designated in accordance with the random number or the command operations set by the outer device. Therefore, the command table can be changed without changing the ROM mask on the IC chip, thereby making it possible to substantially reduce the cost. Further, the command table can be changed to another at regular intervals (every time in the second and third embodiments). Thus, the CLS and COM can be prevented from leading out to the third party. It is also possible to prevent abuses such as an alteration of data by the third party, etc. Since the command table can be changed in accordance with the designation given from the outer device, the first and third embodiments can be easily applied even to an application system for an IC card using different CLS and COM.

According to the present invention as well, the command enable area is provided within the rewritable or reloadable memory (EEPROM) and the enable flags for validating or invalidating the respective commands are provided within the command enable area. Further, the various commands can be invalidated in accordance with the enable flags. Thus, even when it is desired to employ only some of the commands in an application and invalidate the remaining commands, the mask for the ROM may not be changed. The fifth embodiment can avoid a problem that since the all enable flag for validating or invalidating all the commands is provided within the command enable area, the malicious third party cannot decode the CLS and COM even if the third party checks and attacks the CLS and COM so long as all the commands are kept invalid upon completion of the use of the application, and the IC card cannot be used by obtaining erroneous access to the IC card.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An IC card apparatus comprising:
   a card base;
   at least one integrated circuit disposed on said card base; and
   communication means disposed on said card base and coupled to said at least one integrated circuit, for transferring signals between said at least one integrated circuit and an external device;
   wherein said at least one integrated circuit includes:
   a first memory having a command table area for storing command tables, said first memory being a reloadable memory;
   a second memory for storing a non-reloadable command table, said second memory being a read-only memory;
   wherein the command table of the first memory and the command table of the second memory store command class designations which designate the class of each of the commands, and store command code designations which designate the operation corresponding to each of the commands; and
   selecting means, operatively coupled to said first memory and said second memory, for selecting either said non-reloadable command table stored in said second memory or a command table stored in said command table area of said first memory.

2. An IC card apparatus according to claim 1, wherein said selecting means includes management storage means for storing first data representing how many command tables are stored in the first memory, and for storing second data representing a selected command table, the second data being received from an external device to thereby specify any one of the command tables stored in said first memory,
   wherein said selecting means selects the non-reloadable command table stored in said second memory when the first data representing how many command tables are stored in the first memory is "0", and
   wherein said selecting means selects one of the command tables stored in said first memory based on the second data representing a selected command table, when the first data representing how many command tables are stored in said first memory is other than "0".

3. An IC card apparatus according to claim 1, wherein said selecting means includes management storage means for storing random number data and for storing data representing how many command tables are stored in said first memory,
   wherein said selecting means selects the non-reloadable command table stored in said second memory when the data representing how many command tables are stored in said first memory is "0", and
   wherein said selecting means randomly selects a command table stored in said first memory based on the random number data, when the data representing how many command tables are stored in said first memory is other than "0", and provides the random number random number data used to select a command table to the external device.

4. An IC card apparatus according to claim 1, wherein said selecting means includes management storage means for storing data representing a selected command table received from an external device, for storing random number data, and for storing data representing how many command tables are stored in said first memory,
   wherein said selecting means selects the non-reloadable command table stored in said second memory when the data representing how many command tables are stored in the first memory is "0",
   wherein said selecting means selects a command table stored in said first memory when the data representing a selected command table is received from the external device and the data representing how many command tables are stored in the first memory is other than "0", and
   wherein said selecting means randomly selects a command table stored in said first memory based on the random number data and provides the random number data to the external device, when no data representing a selected command table is received from the external device and the data representing how many command tables are stored in the first memory is other than "0".

5. An IC card apparatus comprising:
   a card base;
   at least one integrated circuit disposed on said card base; and
   communication means disposed on said card base and coupled to said at least one integrated circuits, for transferring signals between said at least one integrated circuit and an external device;
   wherein said at least one integrated circuit includes:
   a read-only memory for storing a non-reloadable command table;
   a reloadable memory having a command enable area for storing a plurality of enable flags which indicate whether a respective command stored in said command table is enabled or not enabled;
   a command operation unit for changing each of the enable flags stored in said command enable area in accordance with an instruction from an external device; and
   a command executing unit for checking a respective enable flag corresponding to a command received from the external device, executing command processing when the checked enable flag indicates the command is enabled, and informing the external device of an error when the checked enable flag indicates the command is not enabled.

6. An IC card apparatus according to claim 5, wherein said command enable area of said reloadable memory stores an all enable flag for collectively indicating whether all the commands stored in said command table are enabled or not enabled, and
   wherein said command executing unit first checks the all enable flag when a command is sent from the external device, subsequently effects processing on a command including setting a respective enable flag when the all enable flag indicates the commands are enabled, and informs the external device of an error when the all enable flag indicates the commands are not enabled.

7. An IC card apparatus system comprising an IC card apparatus as defined in claim 1, and
   an external device for changing a command table selected by said selecting means of said IC card apparatus each time said IC card apparatus is used.

8. An IC card apparatus system comprising an IC card apparatus as defined in claim 6; and an external device, for setting the all enable flag of said command enable area when an access to said IC card apparatus is started, and for resetting the all enable flag when the access to said IC card apparatus is completed.

* * * * *